United States Patent [19]
Pascale et al.

[11] Patent Number: 6,105,088
[45] Date of Patent: Aug. 15, 2000

[54] BACKPLANE ASSEMBLY FOR ELECTRONIC CIRCUIT MODULES PROVIDING ELECTRONIC RECONFIGURABLE CONNECTIVITY OF DIGITAL SIGNALS AND MANUAL RECONFIGURABLE CONNECTIVITY POWER, OPTICAL AND RF SIGNALS

[75] Inventors: Michael V. Pascale, Ellicott City; John G. Holland, Baltimore; Walter M. Dirndorfer, Linthicum; Paul LePage, Towson; Kenneth M. Schmidt, Ellicott City, all of Md.

[73] Assignee: Northrop Grumman Corporation, Los Angeles, Calif.

[21] Appl. No.: 09/112,428

[22] Filed: Jul. 10, 1998

[51] Int. Cl.[7] .................................................. G06F 13/00
[52] U.S. Cl. ........................ 710/100; 710/101; 710/129; 710/131
[58] Field of Search ..................................... 710/100, 101, 710/129, 131; 712/15

[56] References Cited

U.S. PATENT DOCUMENTS

| 5,530,842 | 6/1996 | Abraham et al. . | |
| 5,768,598 | 6/1998 | Marisetty et al. | 710/260 |
| 5,790,880 | 8/1998 | Ireton | 712/23 |

*Primary Examiner*—Ario Etienne

[57] ABSTRACT

A reconfigurable backplane assembly for a programmable digital radio and consisting of a printed wire matrix plate including connectors for electronic circuit modules, power cables, RF cables, and optical cables with the connectivity between digital signals being dynamically reconfigurable electronically and with connectivity between power signals, optical signals and RF signals being manually reconfigurable.

26 Claims, 7 Drawing Sheets

FIG. 6

| PIN | SIGNAL | PIN | SIGNAL | PIN | SIGNAL | PIN | SIGNAL |
|---|---|---|---|---|---|---|---|
| B1 |  | B4 |  | A1 |  | A4 |  |
| B2 |  | B5 |  | A2 |  | A5 |  |
| B3 |  | B6 |  | A3 |  | A6 |  |
| 188 | SIG(83) | 187 | SIG(82) | 1 | SIG(0) | 2 | SIG(1) |
| 186 | SIG(81) | 185 | SIG(80) | 3 | SIG(2) | 4 | SIG(3) |
| 184 | SIG(79) | 183 | SIG(78) | 5 | SIG(4) | 6 | SIG(5) |
| 182 | SIG(77) | 181 | SIG(76) | 7 | SIG(6) | 8 | SIG(7) |
| 180 | SIG(75) | 179 | SIG(74) | 9 | SIG(8) | 10 | SIG(9) |
| 178 | SIG(73) | 177 | SIG(72) | 11 | SIG(10) | 12 | SIG(11) |
| 176 | SIG(71) | 175 | SIG(70) | 13 | SIG(12) | 14 | SIG(13) |
| 174 | SIG(69) | 173 | SIG(68) | 15 | SIG(14) | 16 | SIG(15) |
| 172 | SIG(67) | 171 | SIG(66) | 17 | SIG(16) | 18 | SIG(17) |
| 170 | SIG(65) | 169 | SIG(64) | 19 | SIG(18) | 20 | SIG(19) |
| 168 | DGND | 167 | DGND | 21 | AGND | 22 | AGND |
| 166 | SIG(63) | 165 | SIG(62) | 23 | SIG(20) | 24 | SIG(21) |
| 164 | SIG(61) | 163 | SIG(60) | 25 | SIG(22) | 26 | SIG(23) |
| 162 | SIG(59) | 161 | SIG(58) | 27 | A+5Vshared | 28 | A+5Vshared |
| 160 | D+5V | 159 | D+5V | 29 | SIG(24) | 30 | SIG(25) |
| 158 | D+5V | 157 | D+5V | 31 | SIG(26) | 32 | SIG(27) |
| 156 | SIG(57) | 155 | SIG(56) | 33 | A+15Vshared | 34 | A+15Vshared |
| 154 | SIG(55) | 153 | SIG(54) | 35 | SIG(28) | 36 | SIG(29) |
| 152 | IOBUS(17)- | 151 | IOBUS(17)+ | 37 | SIG(30) | 38 | SIG(31) |
| 150 | DGND | 149 | DGND | 39 | AGND | 40 | AGND |
| | | | CENTER PIN | | | | |
| 148 | DGND | 147 | DGND | 41 | AGND | 42 | AGND |
| 146 | DREF- | 145 | DRE+F- | 43 | AGND | 44 | AGND |
| 144 | IOBUS(16)- | 143 | IOBUS(16)+ | 45 | SIG(32) | 46 | SIG(33) |
| 142 | IOBUS(15)- | 141 | IOBUS(15)+ | 47 | SIG(34) | 48 | SIG(35) |
| 140 | IOBUS(14)- | 139 | IOBUS(14)+ | 49 | A+15V | 50 | A+15V |
| 138 | IOBUS(13)- | 137 | IOBUS(13)+ | 51 | A+15V | 52 | A+15V |
| 136 | IOBUS(12)- | 135 | IOBUS(12)+ | 53 | SIG(36) | 54 | SIG(37) |
| 134 | IOBUS(11)- | 133 | IOBUS(11)+ | 55 | SIG(38) | 56 | SIG(39) |
| 132 | IOBUS(10)- | 131 | IOBUS(10)+ | 57 | AGND | 58 | AGND |
| 130 | DGND | 129 | DGND | 59 | AGND | 60 | AGND |
| 128 | IOBUS(9)- | 127 | IOBUS(9)+ | 61 | SIG(40) | 62 | SIG(41) |
| 126 | IOBUS(8)- | 125 | IOBUS(8)+ | 63 | SIG(42) | 64 | SIG(43) |
| 124 | IOBUS(7)- | 123 | IOBUS(7)+ | 65 | A-5V | 66 | A-5V |
| 122 | IOBUS(6)- | 121 | IOBUS(6)+ | 67 | A-5V | 68 | A-5V |
| 120 | IOBUS(5)- | 119 | IOBUS(5)+ | 69 | SIG(44) | 70 | SIG(45) |
| 118 | IOBUS(4)- | 117 | IOBUS(4)+ | 71 | AGND | 72 | AGND |
| 116 | IOBUS(3)- | 115 | IOBUS(3)+ | 73 | AGND | 74 | AGND |
| 114 | DGND | 113 | DGND | 75 | SIG(46) | 76 | SIG(47) |
| 112 | IOBUS(2)- | 111 | IOBUS(2)+ | 77 | SIG(48) | 78 | SIG(49) |
| 110 | IOBUS(1)- | 109 | IOBUS(1)+ | 79 | A+5V | 80 | A+5V |
| 108 | IOBUS(0)- | 107 | IOBUS(0)+ | 81 | A+5V | 82 | A+5V |
| 106 | D+5V | 105 | D+5V | 83 | A+5V | 84 | A+5V |
| 104 | D+5V | 103 | D+5V | 85 | A+5V | 86 | A+5V |
| 102 | RESET- | 101 | RESET+ | 87 | SIG(50) | 88 | SIG(51) |
| 100 | MID(3) | 99 | MID(2) | 89 | SIG(52) | 90 | SIG(53) |
| 98 | MID(1) | 97 | MID(0) | 91 | AGND | 92 | AGND |
| 96 | DGND | 95 | DGND | 93 | AGND | 94 | AGND |
| B7 |  |  |  | A7 |  |  |  |
| B8 |  |  |  | A8 |  |  |  |
| B9 |  |  |  | A9 |  |  |  |

REVERSE SIDE (DIGITAL)     FORWARD SIDE (ANALOG)

BACKPLANE ASSEMBLY FOR ELECTRONIC CIRCUIT MODULES PROVIDING ELECTRONIC RECONFIGURABLE CONNECTIVITY OF DIGITAL SIGNALS AND MANUAL RECONFIGURABLE CONNECTIVITY POWER, OPTICAL AND RF SIGNALS

BACKGROUND OF THE INVENTION

1. Field of the Invention

This invention relates generally to a rack mountable backplane assembly for supporting and interconnecting one or more electronic circuit modules in an electronic system, and more particularly to a reconfigurable backplane assembly for a programmable digital radio and consisting of a printed wire matrix plate including connectors for electronic circuit modules, power cables, RF cables, and optical cables with the connectivity between digital signals being dynamically reconfigurable electronically and with connectivity between power signals, optical signals and RF signals being manually reconfigurable.

2. Description of the Related Art

Apparatus for mounting electronic circuit modules are well known and typically form a necessary component in almost all modular types of electronic equipment. As such, the connector boards in the form of backplanes, provide a means of supporting the modules as well as enabling interconnection therebetween. Conventionally, a dedicated interconnection between the various components is typically provided so that any mid-mission reconfiguration is virtually impossible without a major retrofit.

However, there is now a need for a more flexible approach which embraces dynamically reconfigurable digital signal connectivity, while at the same time accommodating manually reconfigurable high current power signals, optical signals, and RF signals. Such a need exists, for example, in a radio system developed by the assignee of the present invention. Such apparatus is shown and described, in a patent application U.S. Ser. No. 08/522,050 entitled, "Digitally Programmable Multifunction Radio System Architecture", filed in the names of William C. Phillips et al on Aug. 31, 1995, and which is intended to be incorporated herein by reference. The system disclosed in U.S. Ser. No. 08/522,050 is a single radio system that can be digitally reconfigured to operate over a broad frequency band with different signal formats, and is directed to an architecture of a system that provides dynamically programmable and configurable channels, with major portions of the digital and analog channel components combined at the signal frequency translation and waveform processing stages to simplify reconfiguration flexibility and to be scalable to many different types of integrated radio system applications.

SUMMARY

Accordingly, it is an object of the present invention to provide an improvement in apparatus for interconnecting electronic circuitry.

It is another object of the invention to provide a rack mountable backplane assembly for supporting and interconnecting a plurality of electronic circuit modules.

It is a further object of the invention to provide a reconfigurable backplane assembly for supporting and interconnecting a plurality of electronic circuit modules.

It is yet another object of the invention to provide a reconfigurable backplane assembly for a plurality of electronic circuit modules which include processors, exciters, receivers, power amplifiers, and power supplies wherein the connectivity among digital signals is electronically reconfigurable while the conductivity between power signals, optical signals, and RF signals is manually reconfigurable.

Briefly, the foregoing and other objects are achieved by a reconfigurable backplane assembly for supporting a plurality of electronic signal modules and providing electronic reconfigurable connectivity of digital signals while providing manual reconfigurable connectivity of power signals, optical signals, and RF signals, comprising: at least one matrix plate including a plurality of module connector slots and respective fields of first type connector element feedthroughs therein; a predetermined number of module connectors selectively mounted on the matrix plate for receiving a respective complementary connector of an electronic signal module, each of the module connectors including at least one plural pin field of first type connector elements inserted in a respective field of first type connector element feedthroughs for translating digital and audio frequency signals and power used by digital circuitry and at least one plural pin field of second type connector elements located in a removable and exchangeable insert positioned in one of the plurality of signal module connector slots for translating analog signals including RF and optical signals and power used by analog circuitry; circuit means for providing predetermined electronically controlled conductivity of digital signals between the first type connector elements of the module connectors; and circuit means providing predetermined manual conductivity of power signals, optical signals, and RF signals between the second type connector elements of the module connectors and, wherein the circuit means include pairs of power distribution lugs located on the backside of the matrix plate for providing low impedance power distribution from at least one power supply module to power consuming modules via the second type connector elements. Additionally, a field of jumper connectable wire conductor elements including selectively located break points and jumpers extend across the back of the matrix plate for providing connectivity between group(s) of modules requiring a relatively high degree of connectivity therebetween.

Further scope of applicability of the present invention will become apparent from the detailed description provided hereinafter. It should be understood, however, that the detailed description and specific examples disclosed, while indicating the preferred embodiment of the invention, are provided by way of illustration only, since various changes and modifications within the spirit and scope of the invention will become apparent to those skilled in the art from this detailed description.

BRIEF DESCRIPTION OF THE DRAWINGS

The present invention will become more fully understood when considered in connection with the accompanying drawings which are provided by way of illustration only, and thus are not meant to be limitative of the present invention, and wherein:

FIG. 6 is a listing of signal assignments and designated pins for a connector such as shown in FIG. 4;

DETAILED DESCRIPTION OF THE INVENTION

Figure 1:
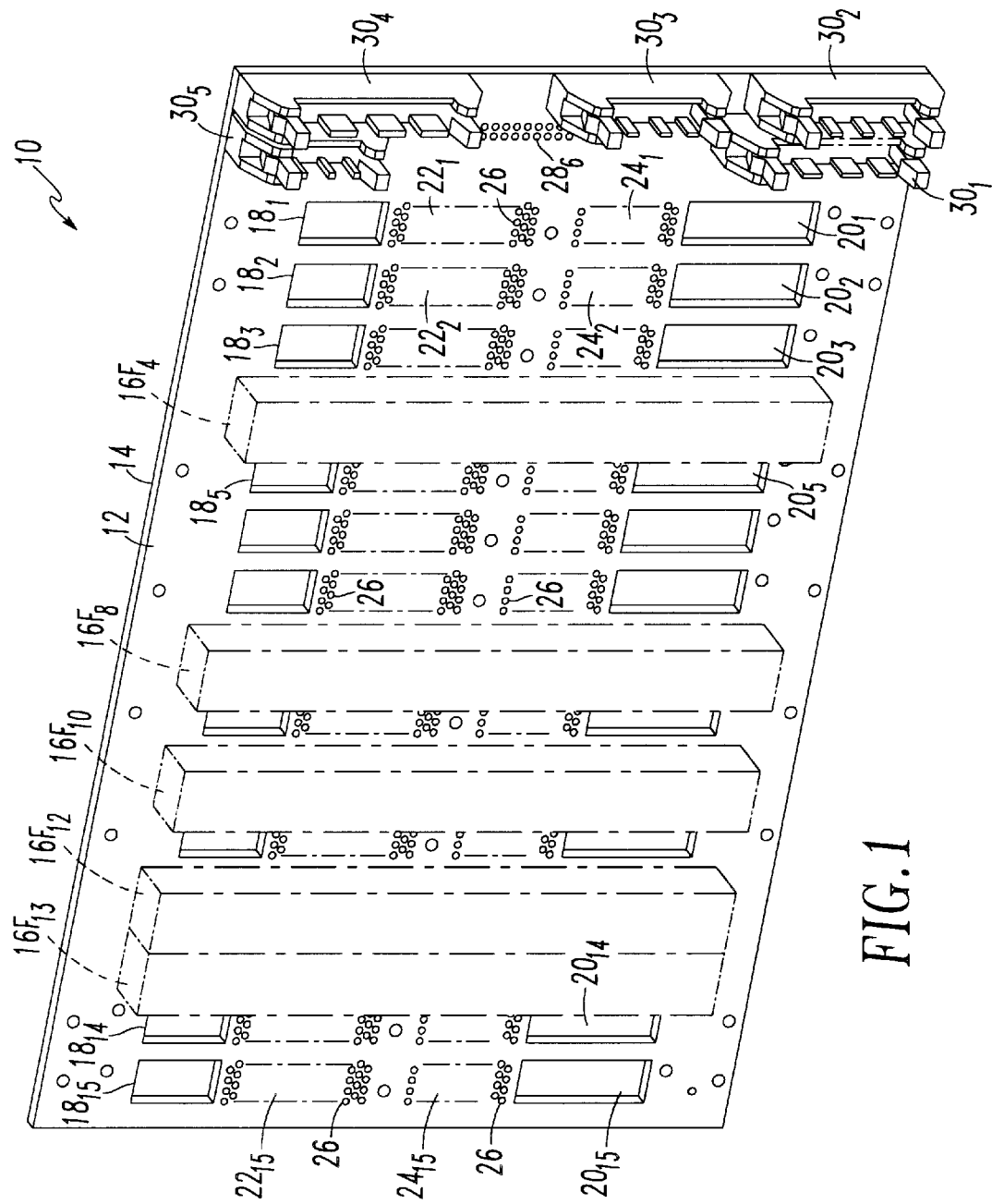
FIG. 1 is a perspective view generally illustrative of the front surface of a reconfigurable backplane assembly in accordance with a preferred embodiment of the invention.
Figure 2:
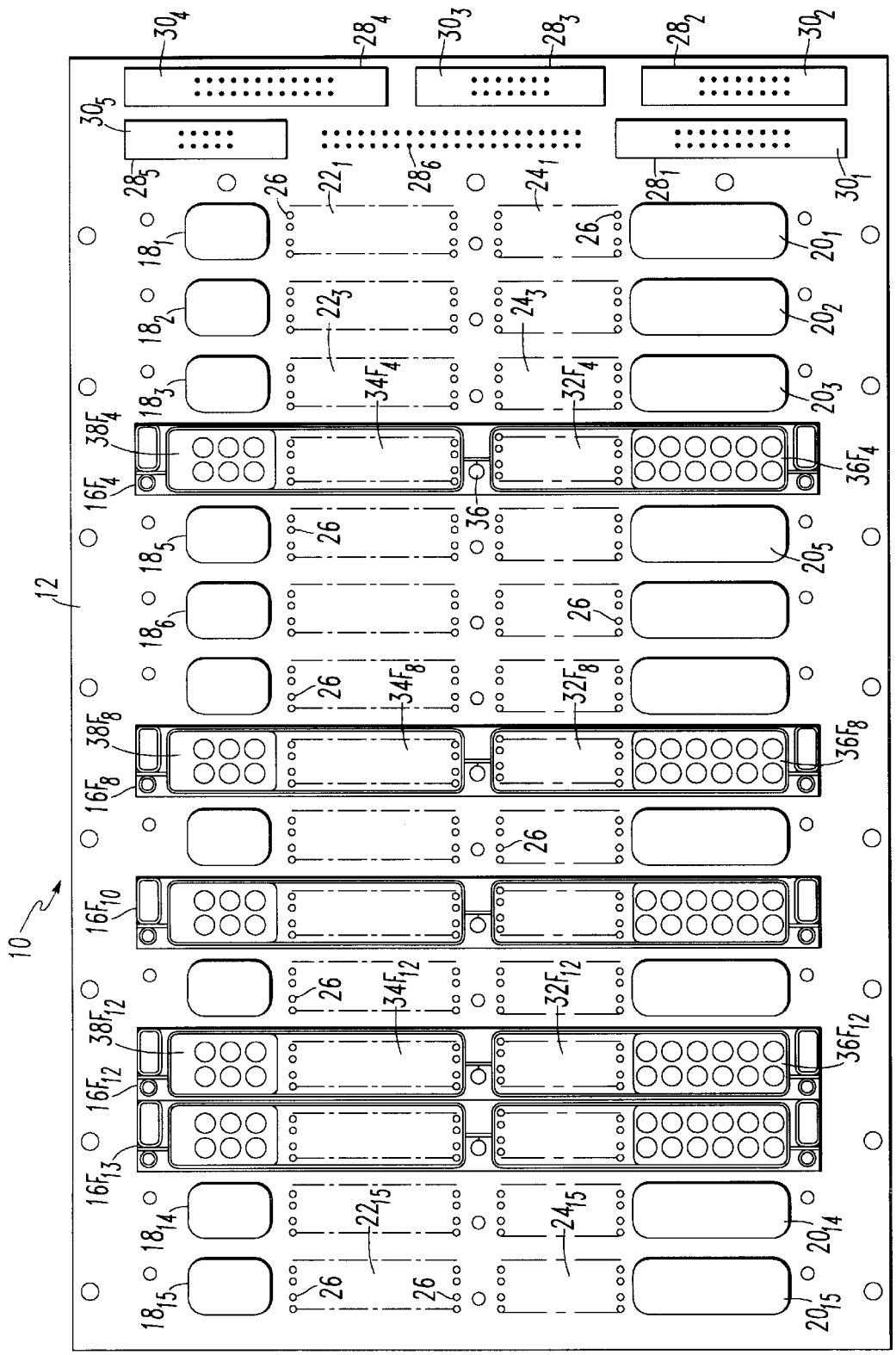
FIG. 2 is a top planar view further illustrative of the front surface of the matrix plate of the backplane assembly shown in FIG. 1.
Figure 3:
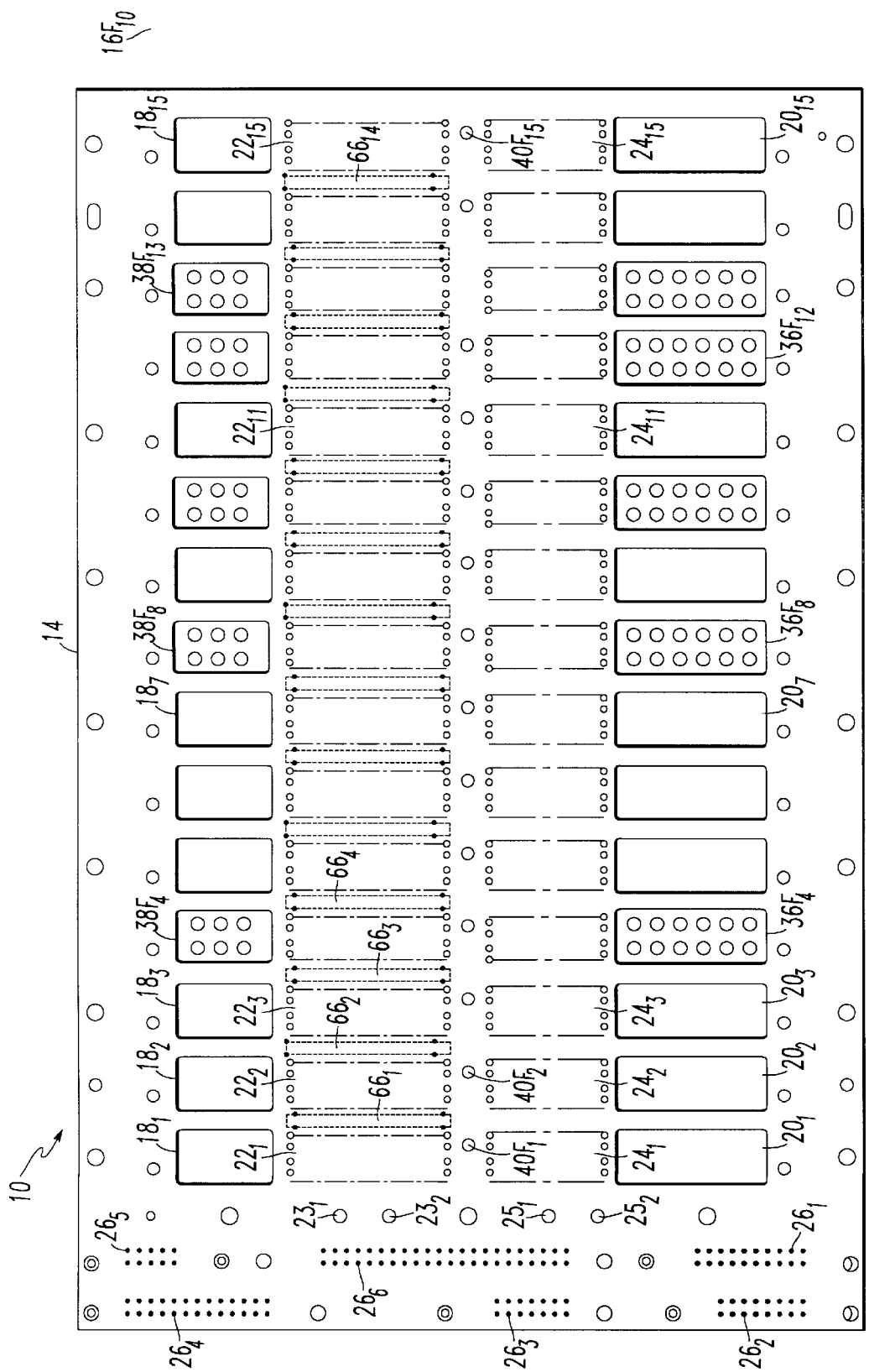
FIG. 3 is a top planar view illustrative of the rear surface of the matrix plate shown in FIG. 1.

Referring now to the drawings wherein like reference numerals refer to like parts throughout, reference numeral 10 in FIG. 1 denotes a backplane matrix plate having a front metallized surface 12 as shown in FIG. 2 and a rear metallized surface 14 as shown in FIG. 3. The matrix plate 10 is rack mountable in a housing, not shown, for modular electronic equipment and which may be, for example, a programmable digital radio such as shown and described in the above referenced U.S. Ser. No. 08/522,050. The matrix plate 10 is used to support a plurality of electronic circuit modules, also not shown, via respective multi-pin electrical connectors which mate with respective complementary connectors on the modules.

Figure 4:
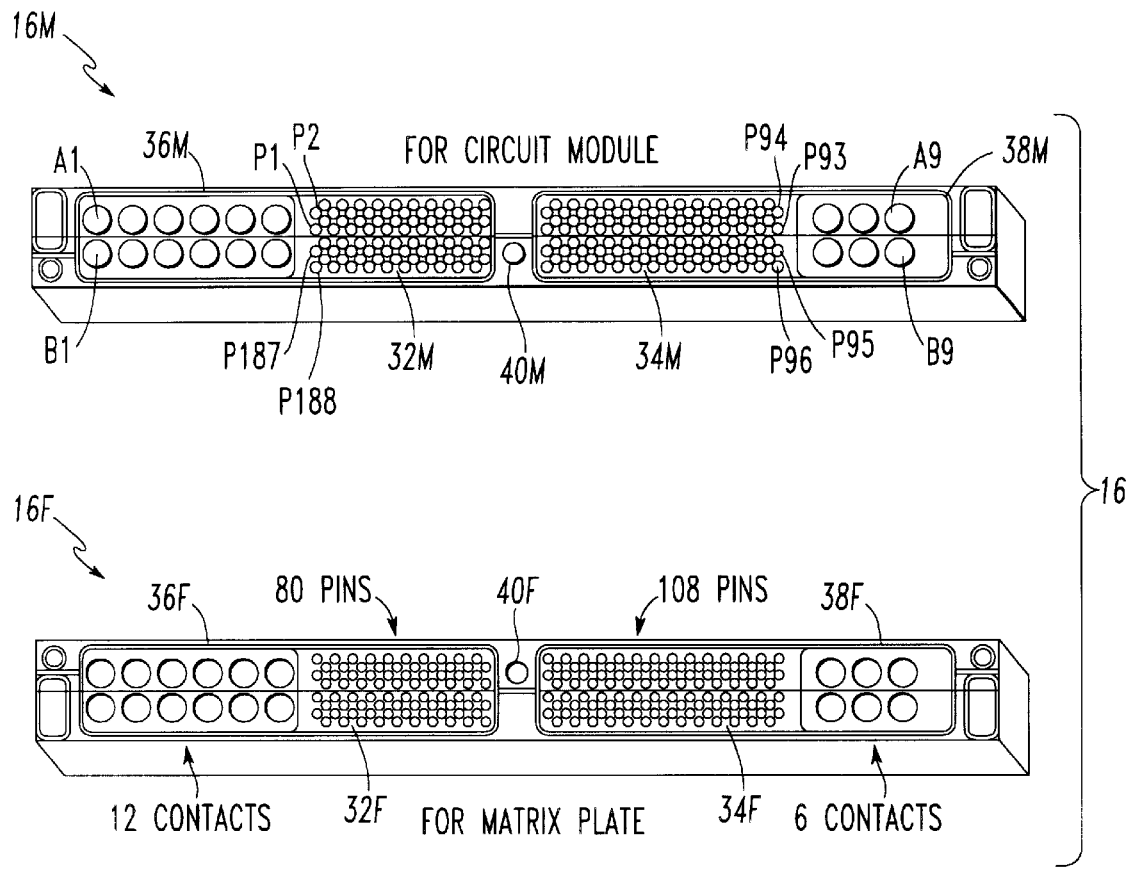
FIG. 4 is a perspective view illustrative of the complementary male and female connectors utilized in the embodiment of the invention shown in FIGS. 1 and 2.

As shown, for example, in FIG. 4, one connector 16M, typically male, forms part of an electronic circuit module, while the other connector 16F, typically female, is mounted on the matrix plate 10. The types of modules supported include processors, exciters, receivers, power amplifiers, and power supplies, not shown, which require interconnection of a mixture of digital signals, high current power signals, optical signals and RF. signals.

As shown in FIGS. 1–3, the matrix plate 10 includes fifteen(15) parallely aligned pairs of spaced part slots $18_1$, $20_1$, $18_2$, $20_2$, ... $18_{15}$, $20_{15}$ which are located side by side. Between each pair of slots $18_1$, $20_1$ ... $18_{15}$, $20_{15}$ are pairs of respective spaced apart fields $22_1$, $24_1$ ... $22_{15}$, $24_{15}$ of connector pin feedthroughs 26 for first type (B3 type) standard connector pins P1–P188 shown in FIG. 4. At one end of the matrix plate 10 are six(6) fields of feedthroughs $28_1$ ... $28_6$ (FIG. 3) for mounting six(6) J-type connectors $30_1$, $30_2$ ... $30_6$ (FIG. 1).

Figure 5:
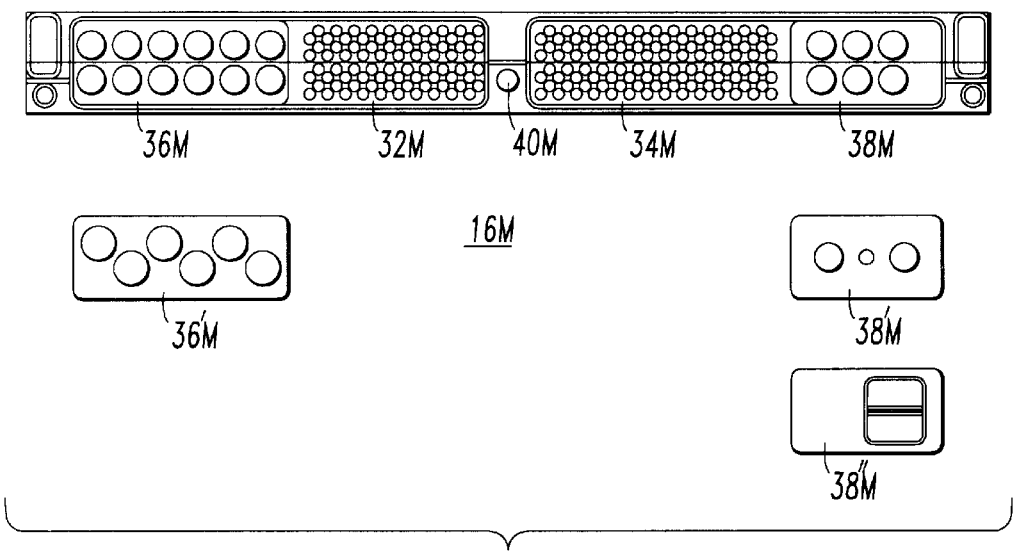
FIG. 5 is a top planar view illustrative of one of the complementary connectors shown in FIG. 4 together with a plurality of exchangeable inserts therefor.

Each pair of slots 18 and 20, as well as the intermediate fields 22 and 24 of feedthroughs 26, are specifically designed to accommodate one elongated female type connector 16F as shown in FIG. 4 and typically comprising an SEME sized connector available, for example, from Amphenol/Bendix. Such an electrical connector consists of one hundred and eighty eight(188) dedicated first type B3 type standard digital pins P1–P188 arranged in two fields 32F and 34F, respectively comprised of eighty(80) and one hundred and eight(108) pins each, and two(2) interchangeable and replaceable commercial off-the shelf inserts 36F and 38F including second type connector pins as shown in FIGS. 4 and 5. These elements mate with the pin fields 32M and 34M and inserts 36M and 38M of a like complementary male connector 16M located on a respective circuit module.

The inserts 36M, 36F and 38M, 38F comprise replaceable inserts as shown in FIG. 5 consisting of inserts 36M and 36'M and inserts 38M, 38'M and 38"M so that up to eighteen(18) pins of contacts can be provided depending on the need. Insert 36M, for example, as well as its mate 36F shown in FIG. 3, includes twelve(12) size 12 RF or power contacts, whereas insert 32'M includes eight(8) RF or power contacts. Insert 38M, on the other hand, includes six(6) size 12 RF or power contacts, while insert 38'M includes a single 270V power contact pair, and insert 38"M includes a contact for an optical conductor. A pair of complementary single point ground pins 40M and 40F is also provided at the center of each of the complementary connectors 16M and 16F (FIG. 4).

The geometry shown with the RF contacts in the inserts 36M, 36F and 38M, 38F at opposite ends of the connectors 16M and 16F is particularly advantageous for modules such as used in a power amplifier for a programmable digital radio system as shown in U.S. Ser. No. 08/522,050,1 which require isolation between low level input RF signals and high level output RF signals and where connections between optical contacts, power contacts, and RF contacts are provided by cables, not shown.

The pin fields 32M, 32F and 34M, 34F of the complementary connectors 16M and 16F are intended for module digital power and ground, digital signals and audio frequency signals. The contacts of the inserts 36M, 36F and 38M, 38F, on the other hand, are used for RF coaxial cable connections and power connections from at least one power supply module, although regulated power from the power supply module can be transmitted through multiple pins of the fields 32M, 32F and 34M, 34F when required. As shown in FIG. 3, a first pair of power lugs $23_1$ and $23_2$ are located to the left of pin field $22_1$ while a second pair of power lugs $25_1$ and $25_2$ are located to the left of pin field $24_1$. Power input to and output from the power supply module is facilitated by predetermined numbered contacts in the inserts 36M, 36F and 38M, 38F. The power output from the power supply module is cabled to one or more of the power lugs $23_1$, $23_2$, and $25_1$, $25_2$ for low impedance distribution to the power consuming modules inserted in the connectors $16F_i$ ... $16F_j$.

Accordingly, the wiring for the matrix plate 10 conducts analog power, digital power and digital signals. The analog (A) power field consists of A+15VDC, A+15VDC shared, A+5VDC, A+5VDC shared, A–5VDC, ground (AGND) and provides highly regulated power which can be used by analog circuitry on the modules plugged into the backplane assembly. The digital (D) power field consists of D+5VDC and DGND and provides power used by digital circuitry on the modules. The digital signal field consists of signals which provide a digital frequency (DREF±), general purpose RS-485 signals (IOBUS)[17:0]±), module identification (MID)[3:0]), system reset (RESET ±) and general purpose signals SIG[83:0]).

FIG. 6 is illustrative of the desired arrangement of pin and signal designations for the connectors 16M and 16F utilized and wiring connections are made among the like signal names as required for the particular application or functional operation selected, for example, from a front panel.

Figure 7:
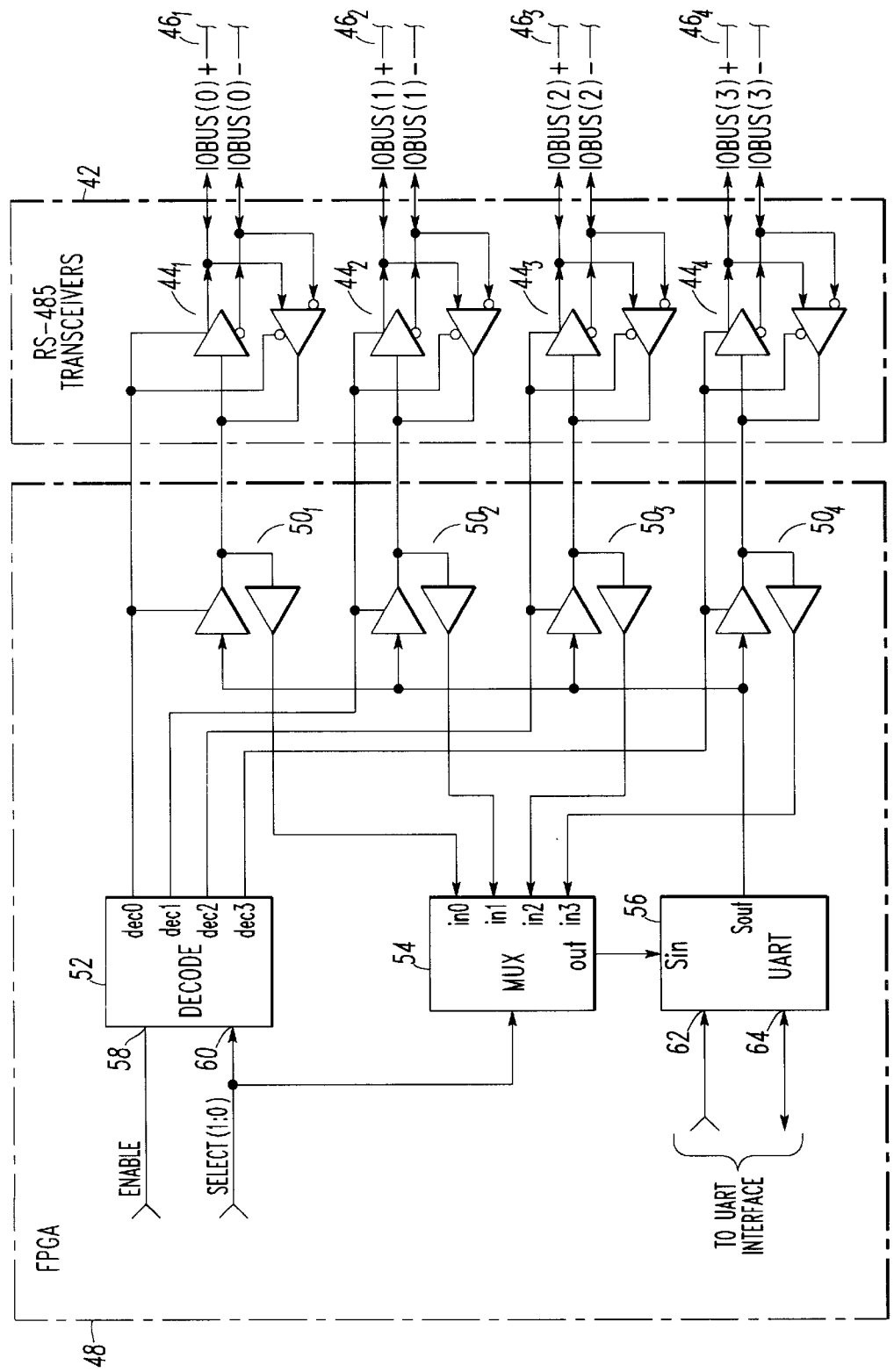
FIG. 7 is an electronic block diagram of a field programmable gate array (FPGA) and a set of RS-45 transceivers for implementing the digital connectivity between modules mounted on the matrix plate of the backplane assembly shown in FIG. 1.

Connectivity between power signals, optical signals and RF signals is manually reconfigurable; however, dynamic connectivity between digital signals is implemented electronically by a plurality of circuit elements as shown in FIG. 7.

Referring now to FIG. 7, shown thereat is the circuit means for providing reconfigurability of the backplane assembly shown, for example, in FIGS. 1–3. As shown, plural sets of multi-drop transceivers, one of which is shown by reference numeral 42 and including four subsets of RS-485 multi-drop transceiver elements $44_1$, $44_2$, $44_3$ and $44_4$, are mounted on the matrix plate 10. The four transceivers $44_1$, $44_2$, $44_3$ and $44_4$, are coupled to a predetermined circuit module mounted on the matrix plate. Four (4) differential pairs of input/output leads $46_1$, $46_2$, $46_3$ and $46_4$, which couple, for example, to predetermined pairs of pin designations 107, 108; 109, 110; 111, 112; and 115, 116 shown in FIG. 6. Digital connectivity between the modules is dynamically reconfigured by tri-stating on/off appropriate transceiver subsets $44_1$, $44_2$, $44_3$ and $44_4$, and which are controlled by a multi-drop transceiver controller 48 which may be, for example, a field programmable gate array (FPGA).

As shown, the FPGA controller 48 includes four subsets of transceivers $50_1$, $50_2$, $50_3$ and $54_4$ which are respectively coupled to the transceiver subsets $44_1$, $44_2$, $44_3$ and $44_4$. Also included in the FPGA 48 is a decoder (DECODE) 52, multiplexer (MUX) 54 and a universal asynchronous receiver/transmitter (UART) 56. The decoder 52 includes an ENABLE input 58 and a SELECT input 60 which receive appropriate signals from an external controller, not shown, for enabling and selecting one of the four transceiver subsets $50_1 \ldots 50_4$ of the FPGA 48 and $44_1 \ldots 44_4$ of the RS 485 transceiver 42 so as to couple to one of the four input/output lead pairs $46_1$, $46_2$, $46_3$ and $46_4$. The multiplexer 54 operates to receive an input signal from the selected lead pair 46, at in0, in1, in2, in3, where it is then fed to the input Sin of UART 56 from the output terminal (out). The UART 70 operates in response to control signals applied to pin 62. Accordingly, the signal at Sin is coupled to pin 64 where it is then fed via a bidirectional signal line/data bus to an external controller/processor, not shown. In the reverse direction signals from the external controller/processor one fed to output terminal Sout where they coupled to selected lead pairs $46, \ldots 46_4$ via the transceiver subsets $50_1 \ldots 50_4$.

The configuration image(s) of each FPGA 48 is stored in the memory of a digital signal processor, not shown. As the time line of operation progresses, wherein the present selectable operational mode changes, the supporting FPGAs are reconfigured, as required, in a matter of milliseconds to operate with a synchronous serial data, or parallel data, critical timing information, and combinations thereof on any desired subset of transceivers. Thus the need for dedicated multiplexing and decoding is eliminated. Also, FPGA images can be added to support new, different and unanticipated digital signalling requirements.

Figure 8:
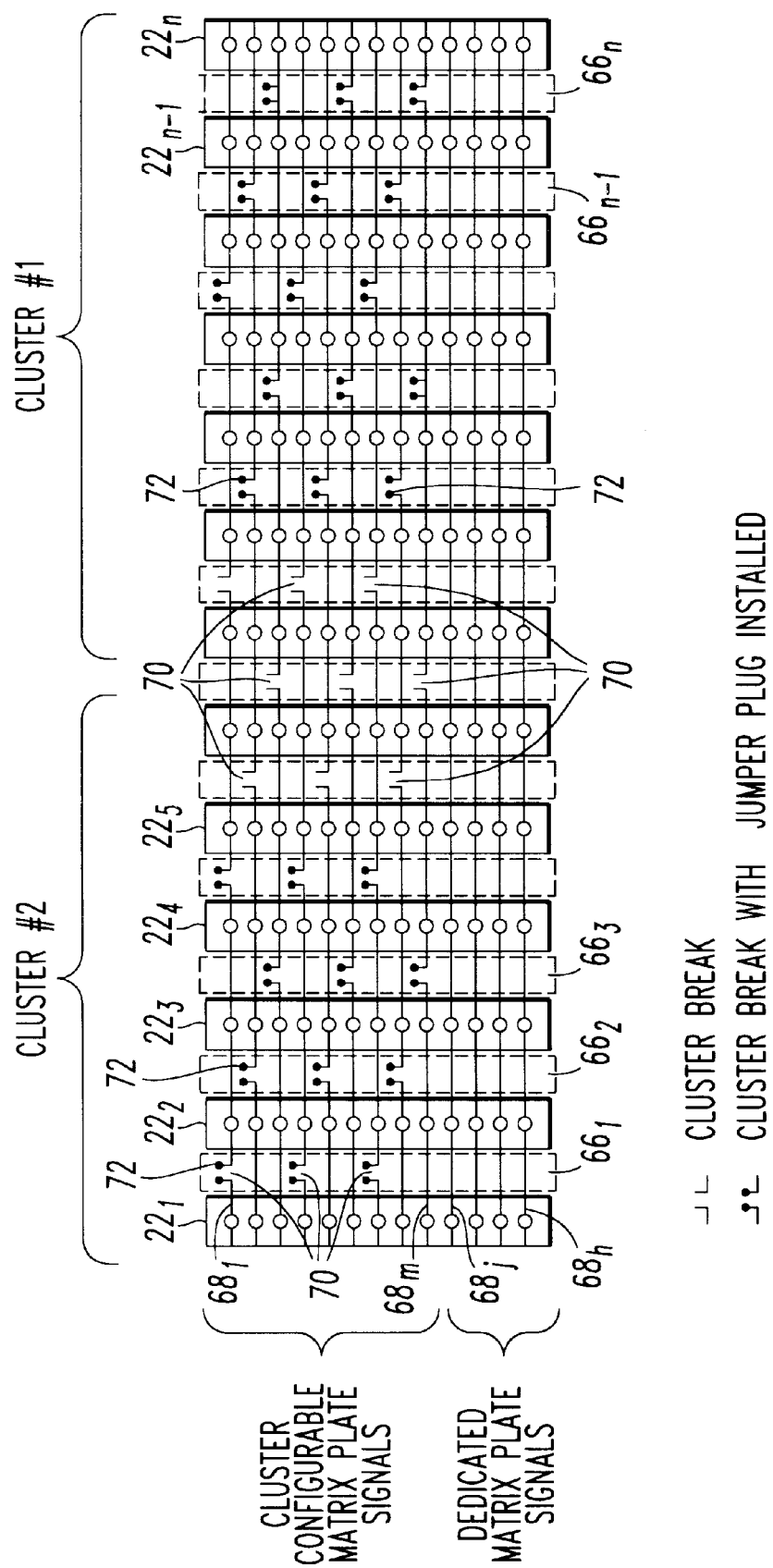
FIG. 8 is an electrical schematic diagram illustrative of a manual interconnection of a plurality of jumper connectable make/break points for configuring a cluster of modules on the rear face of the matrix plate assembly shown in FIG. 3.

A third feature of the present invention is the inclusion of multiple fields, for example, fields $66_1$, $66_2 \ldots 66_m$ of cluster make/break points and cross-overs as shown in FIG. 8 for conserving the utilization of matrix plate wiring resources where a high degree of connectivity is required between a group of modules called a "cluster" which are populated in mutually adjacent matrix plate locations and where only a moderate degree of conductivity is required between the clusters. further as shown in FIG. 3, fourteen felds $66_1 \ldots 66_{14}$ are located on the rear surface 14 of the matrix plate 10 between mutually adjacent pin fields $22_1 \ldots 22_{15}$. These fields are designed to permit the matrix plate signals of predetermined contiguous pin posts for two clusters of modules #1 and #2 to be either isolated from or connected to similar signals in adjacent pin posts.

The fields $66_1 \ldots 66_n$ are manually connected by a field of parallel horizontal jumper connectable wire leads $68_1 \ldots 68_m$ which include selectively located break points 70. The break points 70 are furthermore vertically staggered to conserve space as shown in FIG. 8 and are adapted to receive a respective jumper plug 72, as required, to make a desired hardwire interconnect. By selectively installing jumper plugs 72 across cluster break points 70, the physical matrix plate signals which are used for local connections within one cluster can be configured as desired. Clusters are isolated by unjumpered break points.

FIG. 8 discloses that, in addition to the cluster break point and jumper plug configurations, one or more continuous wire leads $68_j \ldots 68_k$, can be also extended between the fields $66_1 \ldots 66_n$ so as to provide continuous wiring for dedicated matrix plate signals between fields of some or all of the clusters. Thus provisions are made to allow the matrix plate signals of same contiguous matrix plate slots to be either isolated from or connected to similar signals in adjacent sections of contiguous matrix plate slot positions.

Thus what has been shown and described is a readily reconfigurable backplane particularly useful in connection with electronic communications systems which need to operate in selectively different modes and which requires dynamically reconfigurable circuit conductivity.

The invention being thus described, it will be obvious that the same may be varied in many ways. Such variations are not meant to be regarded as a departure from the spirit and scope of the invention as set forth in the appended claims, but all such modifications as would be obvious to one skilled in the art are intended to be included.

What is claimed is:

1. A reconfigurable backplane assembly for supporting a plurality of electronic signal modules and providing electronic reconfigurable connectivity of digital signals while providing manual reconfigurable connectivity of power signals, optical signals, and RF signals, comprising:

at least one matrix plate including a plurality of module connector slots and respective fields of first type connector element feedthroughs therein;

a predetermined number of electrical connectors selectively mounted on the matrix plate for receiving a respective complementary connector of an electronic signal module, each of the electrical connectors including at least one plural pin field of first type connector elements inserted in the respective field of first type connector element feedthroughs for translating digital and audio frequency signals and power used by digital circuitry and at least one plural pin field of second type connector elements located in a removable and exchangeable insert positioned in one of the plurality of module connector slots for translating analog signals including RF and optical signals and power used by analog circuitry;

first circuit means for providing predetermined electronically controlled connectivity of digital signals between the first type connector elements of the module connectors; and second circuit means for providing predetermined manual connectivity of power signals, optical signals, and RF signals between the second type connector elements of the module connectors.

2. A reconfigurable backplane assembly in accordance with claim 1 wherein the first type of connector element comprises a fixed pin type connector element.

3. A reconfigurable backplane assembly in accordance with claim 1 wherein the second type of connector element comprises a coaxial connector element, a power contact element, or an optical fiber connector element.

4. A reconfigurable backplane assembly in accordance with claim 1 wherein the first type of connector element comprises a fixed pin type connector element and the second type of connector element comprises a coaxial connector element, a power contact element, or a fiber optic connector.

5. A reconfigurable backplane assembly in accordance with claim 1 wherein said second circuit means includes relatively low impedance power distribution means located on said matrix plate for coupling power from at least one power supply to one or more power consuming modules through said second type connector elements.

6. A reconfigurable backplane assembly in accordance with claim 5 wherein said means for coupling power companies an arrangement of lugs mounted on a rear surface of the matrix plate adjacent one of said module connector slots.

7. A reconfigurable backplane assembly in accordance with claim 1 wherein the plurality of module connector slots comprise pairs of spaced apart mutually aligned generally rectangular slots arranged side by side and wherein the respective fields of the first type of connector element feedthroughs are located between each said pair of slots, wherein said at least one plural pin field of first type connector elements comprises a pair of plural pin fields of first type connector elements inserted in the feedthroughs and wherein said at least one plural pin field of second type connector elements comprises a pair of plural pin fields of second type connector elements located in respective inserts positioned in respective connectors projecting through each pair of module connector slots.

8. A reconfigurable backplane assembly in accordance with claim 7 wherein each field of connector feedthroughs comprises a first set of feedthroughs located adjacent one slot of said pair of slots and a second set of feedthroughs spaced apart from said first set of feedthroughs and located adjacent the other slot of said pair of slots.

9. A reconfigurable backplane assembly in accordance with claim 7 wherein said matrix plate includes printed wiring metallization applied to both front and back surfaces of the matrix plate, and wherein a predetermined number of the connector element feedthroughs are insulated from said metallization.

10. A reconfigurable backplane assembly in accordance with claim 7 and additionally including a ground connection, between the fields of first type of connector element feedthroughs.

11. A reconfigurable backplane assembly in accordance with claim 1 wherein said first circuit means providing predetermined electronically controlled connectivity includes a plurality of bidirectional signal translation circuit elements connected to the first type connector elements and being selectively rendered conductive and nonconductive by a control circuit to connect one or more pairs of electrical signal conductors between predetermined modules.

12. A reconfigurable backplane assembly in accordance with claim 11 wherein the bidirectional signal translation circuit elements comprises transceiver devices.

13. A reconfigurable backplane assembly in accordance with claim 12 wherein the transceiver devices comprise multi-drop transceivers.

14. A reconfigurable backplane assembly in accordance with claim 12 wherein the control circuit includes a signal source/sink.

15. A reconfigurable backplane assembly in accordance with claim 12 wherein said control circuit comprises a recongifurable control circuit.

16. A reconfigurable backplane assembly in accordance with claim 12 wherein said control circuit comprises a control circuit which is reconfigurable on demand.

17. A reconfigurable backplane assembly in accordance with claim 7 and additionally including at least one additional plural pin field of feedthroughs located at one end of the matrix plate for receiving at least one plug type connector thereat.

18. A reconfigurable backplane assembly in accordance with claim 17 wherein said at least one additional plural pin field of feedthroughs comprises a plurality of plural pin fields of feedthroughs for receiving a plurality of plug type connectors thereat.

19. A reconfigurable backplane assembly in accordance with claim 18 and additionally including a selective number of plug type connectors inserted in the plurality of plural pin fields of feedthroughs.

20. A reconfigurable backplane assembly in accordance with claim 1 and additionally including a field of jumper connectable wire conductors including selectively located break points for providing connectivity between a predetermined number of connectors requiring a relatively high degree of connectivity therebetween.

21. A reconfigurable backplane assembly in accordance with claim 20 wherein said predetermined number of connectors comprise a plurality of connectors located relatively close to another in clusters where only a relatively moderate degree of connectivity is required between clusters.

22. A reconfigurable backplane assembly in accordance with claim 20 wherein the field of wire conductors comprise substantially parallel rows of wire conductors.

23. A reconfigurable backplane assembly in accordance with claim 22 wherein the break points of adjacent wire elements are mutually offset relative to one another in a predetermined direction.

24. A reconfigurable backplane assembly in accordance with claim 20 and additionally including one or more jumpers installed at selective break points of said cluster.

25. A reconfigurable backplane assembly in accordance with claim 20 and additionally including a field of wire conductors devoid of break points located adjacent the field of jumper connectable wire conductors.

26. A reconfigurable backplane assembly in accordance with claim 25 wherein the field of wire conductors devoid of break points comprise substantially parallel rows of wire conductors.

* * * * *